United States Patent [19]
Bassetti et al.

[11] Patent Number: 5,378,259
[45] Date of Patent: Jan. 3, 1995

[54] PROCESS FOR GRANULATING AMMONIUM NITRATE FERTILIZER

[75] Inventors: Martino Bassetti, Forlí; Vito De Lucia, Lodi, both of Italy

[73] Assignee: Enichem Agricoltura S.p.A., Palermo, Italy

[21] Appl. No.: 994,902

[22] Filed: Dec. 22, 1992

[30] Foreign Application Priority Data

Dec. 23, 1991 [IT] Italy .................. MI91 A 003472

[51] Int. Cl.$^6$ .............................................. C05C 1/02
[52] U.S. Cl. ............................................ 71/59; 71/60; 71/63; 71/64.06
[58] Field of Search ............... 71/59, 60, 63, 64.06, 71/64.07, 64.13

[56] References Cited

U.S. PATENT DOCUMENTS 4,398,936 8/1983 Hoogendonk et al. ............ 71/64.06

FOREIGN PATENT DOCUMENTS 517695 5/1921 France .
2029086 12/1970 Germany .
3241443 5/1983 Germany .

OTHER PUBLICATIONS

CA 112(21): 197125e "Method for suppressing . . . of nitrogen" 1989.
Chemical Abstracts, vol. 96, No. 23, Jun. 7, 1982, AN-198533z, Jaeger et al, "Surface Treatment of Granular Ammonium Nitrate".
Chemical Abstracts, vol. 78, No. 11, Mar. 19, 1973, AN-70709x, Shirokou et al, "Application of Ammonium Sulfate and Phosphate Additives on Ammonium Nitrate Granules in a Fluidized Bed".

*Primary Examiner*—Ferris Lander
*Attorney, Agent, or Firm*—Oblon, Spivak, McClelland, Maier, & Neustadt

[57] ABSTRACT

The invention relates to a process for granulating ammonium nitrate fertilizer with a nitrogen content of between 25% and 34% by weight, by forming a mix of $NH_4NO_3$, limestone and/or dolomite, ammonium sulphate and/or ammonium phosphates and $MgSO_4$, this latter being added in any one of its crystalline forms and its various degrees of hydration, then granulating or prilling, and cooling.

5 Claims, 1 Drawing Sheet

PROCESS FOR GRANULATING AMMONIUM NITRATE FERTILIZER

This invention relates to a process for producing ammonium nitrate fertilizer with a nitrogen content of between 25% and 34% by weight.

In prilling (or other granulation processes), the molten ammonium nitrate is concentrated to a substantially anhydrous 99.5-99.7% at a temperature of 172°-175° C. It is then mixed with inerts (generally ground limestone and/or dolomite) until the required nitrogen content (typically between 25% and 34% by weight) is achieved, after which $Ca(NO_3)_2$ formation inhibitors (ammonium sulphate, ammonium phosphates) are added. The molten mixture prepared in this manner is fed to the prilling process at a temperature of 172°-175° C. and crystallized by spraying from a rotary drum to form prills at 162°-165° C. against countercurrent air leaving at 50° C.

During the prilling operation (or in Spheroidizer granulators in which the concentration of the $NH_4NO_3$ mix exceeds 99.5%), ammonium nitrate vapour (in the form of fumes) forms to give rise to a sub-micronic emission, which increases during the summer months and is visible even at low concentration at the air outlets of the prilling tower.

The formation of these fumes is caused by the volatility of the salt at the operating temperature, which depends on the water content (which determines the crystallization temperature).

To better appreciate this phenomenon, Table 1 shows the volatility of ammonium nitrate as a function of temperature.

To eliminate the ammonium nitrate fumes, processes have been devised which are very expensive in terms both of investment and energy costs, because of the sub-micronic particle size of the dust and the large air volume involved.

A first method was devised by Andersen (Cheaf system) and is based on removing the dust by a mechanism involving impact and agglomeration of the particles with droplets of a wash solution in passing through a permeable panel of very fine fibres (diameter 7 $\mu$m) of teflon or polypropylene.

This system has a series of drawbacks which can be summarized as follows:
  the need to frequently replace the agglomerating panels, with consequent reduction in the plant capacity;
  the system has not been applied industrially to ammonium nitrate prilling towers but only to urea prilling towers;
  high installed weight in the prilling tower;
  long stop time for inserting the system;
  closure of some of the various air outlets when out of service.

A second method is the Beco Engineering method, which is based on injecting gaseous ammonia into the area immediately surrounding the prilling drum, in order to create around the mixture droplets sprayed by the drum an ammonia-rich film, the partial pressure of which inhibits the formation of the ammonium nitrate aerosol. The discharge air containing the injected ammonia is then fed to a low pressure-drop scrubber for removing the ammonia by means of an acid solution of ammonium nitrate.

The Beco Engineering system has been applied industrially to prilling towers for pure ammonium nitrate at certain companies (Nitram Inc. and Mississippi Chemical Corp.).

This system has a series of drawbacks which can be summarized as follows:
  the system has never been applied to rotary prilling drums;
  if the system is out of service one of the air outlets has to be closed.

The third removal system is the ERT-PEC method, which is based on total recycling of the prilling air by forming a closed circulation circuit, with cooling and washing of the circulating air in a heat and mass transfer apparatus by means of an ammonium nitrate solution (sub-cooled by a refrigeration system using ammonia evaporation). The system has already been applied industrially in the prilling tower of a Spanish company (ERT).

This system has a series of drawbacks which can be summarized as follows:
  the system is very complicated even compared with the other systems;
  high investment cost;
  technology not completely developed;
  high installed power.

These three fume removal methods require a series of systems the installation of which requires substantial modifications to the plant, with consequent high investment cost followed by high maintenance and operating costs.

One example is the Monsanto-C.F.C.A. system. This system consists of installing a hood around the tower spraying component (C.F.C.A. technology) and conveying that part of the air with the highest ammonium nitrate fume content through the hood to a Brink Monsanto wet filtration system, comprising acid pre-removal through a cyclone separator (for droplet separation) followed by final removal of sub-micronic particles through a demister with glass fibre filter candles (ES type).

In addition to the obvious cost, this system results in:
  a 15-20% loss of tower production capacity:
  very serious clogging problems depending on the type and quantity of diluting limestone.

To prevent or at least limit to the greatest possible extent the emission of ammonium nitrate fumes from prilling towers, the applicant has devised a process which does not suffer from the aforesaid drawbacks of the known art, but which on the contrary surprisingly effective resulting in a product with quality characteristics satisfying commercial specifications.

In its widest aspect, the invention provides a process for granulating ammonium nitrate fertilizer with a nitrogen content of between 25 and 34% by weight, by forming a mix of $NH_4NO_3$, limestone and/or dolomite, and ammonium sulphate and/or ammonium phosphates in which the mix has a free water content of 1-1.5% and a temperature of 150°-65° C. when fed to granulation, then granulating (or prilling) and cooling, characterised in that said mix contains $MgSO_4.xH_2O$ where x is between 0 and 7.

BRIEF DESCRIPTION OF THE FIGURES

The invention is described hereinafter with reference to the accompanying FIGURE, which represents an outline scheme of the new process without in any way limiting the scope of the invention.

With reference to the FIGURE, a concentrated aqueous ammonium nitrate solution (1) to which ammonium sulphate (2) and ammonium phosphates (3) are added in the mixer $V_1$ is further concentrated in the evaporator $E_1$ under vacuum and the resultant mixture is separated from steam (a) in the separator vessel (D).

Figure 1:
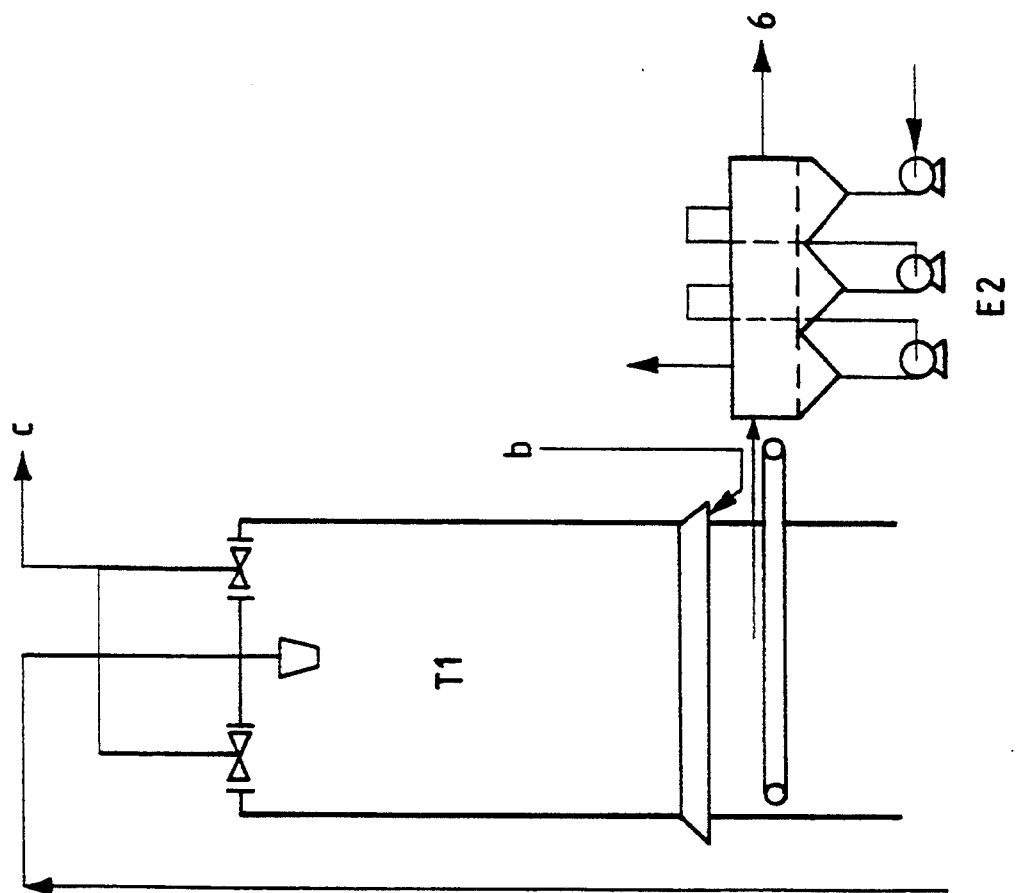
Figure 1:
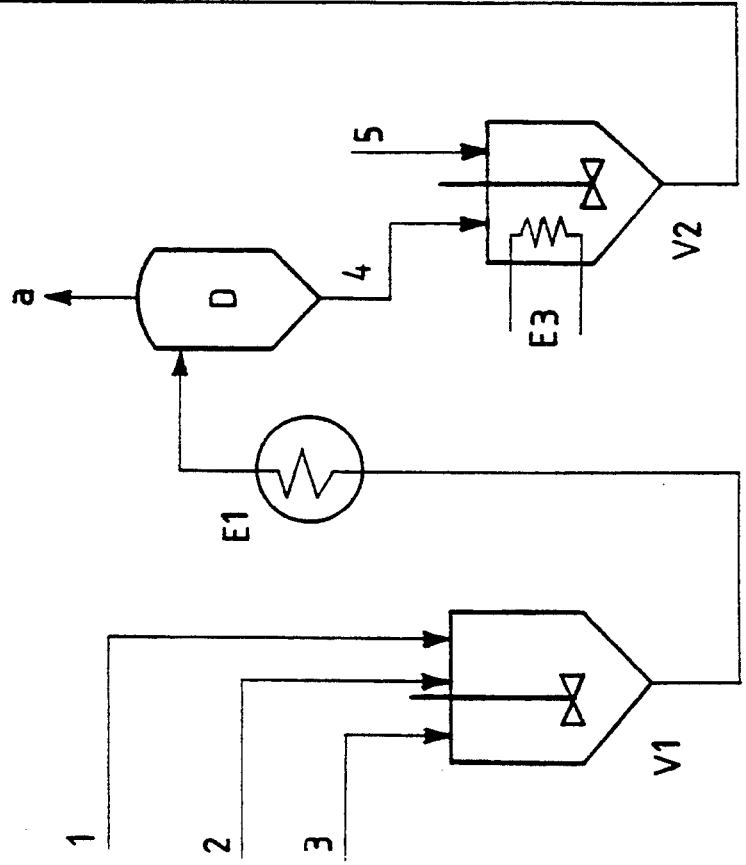

The molten salt (4) obtained in this manner passes into the mixer $V_2$ where it is mixed with ground anhydrous limestone and/or dolomite (5) in a suitable ratio to obtain a mix of molten salts. Said mix is maintained in the molten state by a heating coil $E_3$ and fed to the prilling tower ($T_1$) in countercurrent with an air stream (b). A stream of hot air (c) leaves the prilling tower $T_1$. The final product (6) is cooled in the prilling tower and passes to a subsequent fluidized bed cooler ($E_2$).

The following examples illustrate the present invention but without limiting its scope of protection.

EXAMPLE 1 (comparative example)

The 95% concentrated aqueous ammonium nitrate solution with added ammonium sulphate (0.4%) and ammonium phosphates (0.15%) is concentrated to 99.6% in the evaporator $E_1$ under vacuum at a temperature of 170°–175° C.

The molten salt obtained in this manner is mixed in the mixer $V_2$ with ground anhydrous limestone and/or dolomite in a 3/1 ratio to obtain a mix containing 26% of nitrogen by weight.

The residence time in $V_2$ is 5–10 minutes.

The crystallization temperature of the mix is 164°–166° C.

The mix is maintained molten by a heater and is fed to the prilling tower at a temperature of 172° C.

The cooling air leaving the prilling tower $T_1$, at a rate of 10 $Nm^3$/kg of mix and a temperature of 30°–50° C., has a sub-micronic ammonium nitrate content of 55 $mg/Nm^3$.

The final product, cooled to 30° C. in the prilling tower $T_1$ and the subsequent fluidized bed cooler $E_2$, has the following chemical and physical characteristics:

| | |
|---|---|
| nitrogen content | 26% by weight |
| free water content | <0.5% by weight |
| average prill diameter | 2.3 mm |
| average hardness | 1500 g/2 mm granule |
| packing index 68 h | <1000 g/cm$^2$ (non-coated salt) |
| hygroscopicity 70% R.H., 10 hours | 1.7% |
| relative critical humidity | 58% |
| total water content | <0.5% by weight |

EXAMPLE 2

Addition of magnesium sulphate in aqueous solution to $V_1$

A concentrated $MgSO_4$ solution is added to the traditional mixture in $V_1$ in such a quantity as to obtain an $MgSO_4$ concentration of 1.3%.

The mixture is concentrated in the evaporator $E_1$ to 98.5% concentration at a temperature of 155°–160° C.

The molten salt obtained in this manner is mixed in $V_2$ with ground limestone and/or dolomite in the ratio 3/1.

The residence time in $V_2$ is 5–10 minutes.

The mix crystallization temperature is about 149°–151° C.

The mix is maintained molten by a heater and is fed to the prilling tower at a temperature of 157° C.

The cooling air leaving the prilling tower $T_1$, at a rate of 10 $Nm^3$/kg of mix and a temperature of 30°–50° C., has a sub-micronic ammonium nitrate content of 20 $mg/Nm^3$.

The final product, cooled to 30° C. in the prilling tower $T_1$ and the subsequent fluidized bed cooler $E_2$, has the following chemical and physical characteristics:

| | |
|---|---|
| nitrogen content | 25% by weight |
| free water content | <0.5% by weight |
| average prill diameter | 2.3 mm |
| average hardness | 1800 g/2 mm granule |
| packing index 68 h | <1000 g/cm$^2$ (non-coated salt) |
| hygroscopicity 70% R.H., 10 hours | 1.7% |
| relative critical humidity | 57% |
| total water content | <1.3% by weight |

The difference between the total water content and the free water content is given by the water fixed as water of crystallization in the following formulas:

$MgSO_4.7H_2O$ $Mg(NH_4)_2(SO_4)_2.6H_2O$ $MgNH_4PO_4.6H_2O$ $MgHOP_4.3H_2O$

EXAMPLE 3

Addition of $MgSO_4.7H_2O$ (Epsom salt) or $MgSO_4.H_2O$ (Kieserite) or anhydrous $MgSO_4$ directly into $V_2$ The traditional mixture formed in $V_1$ is concentrated to 99.6% in the evaporator $E_1$ at a temperature of 170°–175° C.

The molten salt obtained is mixed in $V_2$ with ground anhydrous limestone and/or dolomite in a 3/1 ratio and $MgSO_4.7H_2O$ is added in such a quantity as to obtain an $MgSO_4$ concentration of 1.0% (20 kg/t).

The residence time in $V_2$, about 10 minutes, and the temperature the mix, maintained at 157° C., are sufficient to release all the water of crystallization.

The resultant crystallization temperature is 149°–151° C.

The mix is maintained molten by a heater and is fed to the prilling tower at a temperature of 157° C.

The cooling air leaving the prilling tower $T_1$, at a rate of 10 $Nm^3$/kg of mix and a temperature of 30°–50° C., has a sub-micronic ammonium nitrate content of 20 $mg/Nm^3$.

The final product, cooled to 30° C. in the prilling tower $T_1$ and the subsequent fluidized bed cooler $E_2$, has the following chemical and physical characteristics:

| | |
|---|---|
| nitrogen content | 25% by weight |
| free water content | <0.5% by weight |
| average prill diameter | 2.3 mm |
| average hardness | 1800 g/2 mm granule |
| packing index 68 h | <1000 g/cm$^2$ (non-coated salt) |
| hygroscopicity 70% R.H., 10 hours | 1.7% |
| relative critical humidity | 57% |
| total water content | <1.3% by weight |

As an alternative to $MgSO_4 \cdot 7H_2O$, Kieserite ($MgSO_4 \cdot H_2O$) or anhydrous $MgSO_4$ can be used, adding to the mix the water corresponding to the molecules not contained in the mineral salt.

EXAMPLE 4

Addition of $MgSO_4 \cdot 7H_2O$ or $MgSO_4 \cdot H_2O$ (Kieserite) or anhydrous $MgSO_4$ directly into $V_2$ The traditional mixture formed in $V_1$ is concentrated to 99.6% in the evaporator $E_1$ at a temperature of 170°–175° C.

The molten salt obtained is mixed in $V_2$ with ground anhydrous limestone and/or dolomite in a 3/1 ratio, and $MgSO_4 \cdot 7H_2O$ is added in such a quantity as to obtain an $MgSO_4$ concentration of 3.0% (60 kg/t).

The residence time in $V_2$, about 10 minutes, and the temperature of the mix, maintained at 157° C., are sufficient to release all the water of crystallization.

The resultant crystallization temperature is 135° C.

The mix is maintained molten by a heater and is fed to the prilling tower at a temperature of 150° C.

The cooling air leaving the prilling tower TI, at a rate of 10 $Nm^3$/kg of mix and a temperature of 30°–50° C., has a sub-micronic ammonium nitrate content of 13 $mg/Nm^3$.

The final product, cooled to 30° C. in the prilling tower $T_1$ and the subsequent fluidized bed cooler $E_2$, has the following chemical and physical characteristics:

| | |
|---|---|
| nitrogen content | 25% by weight |
| free water content | 1.15% by weight |
| average prill diameter | 2.3 mm |
| average hardness | 1000 g/2 mm granule |
| packing index 68 h | <1500 $g/cm^3$ (non-coated salt) |

As an alternative to $MgSO_4 \cdot 7H_2O$, Kieserite ($MgSO_4 \cdot H_2O$) or anhydrous $MgSO_4$ can be used, adding to the mix the water corresponding to the molecules not contained in the mineral salt.

Table 2 summarizes the relative $NH_4NO_3$ vapour emission on the basis of the quantity of $MgSO_4 \cdot xH_2O$ added.

TABLE 1

| Physical state | Temperature (°C.) | Vapour pressure (mm Hg) |
|---|---|---|
| SOLID | 38 | 0.015 |
| | 111 | 0.037 |
| | 129 | 0.126 |
| | 143 | 0.289 |
| | 160 | 0.958 |
| LIQUID | 170 | 1.4 |
| | 180 | 2.51 |
| | 190 | 3.69 |
| | 200 | 6.31 |
| | 210 | 9.05 |

TABLE 2

| $MgSO_4 \cdot xH_2O$ (%) (*) | — | 1 | 1.3 | 3 |
|---|---|---|---|---|
| Emission ($mg/Nm^3$) | 55 | 20 | 20 | 13 |

(*) x is a number between 0 and 7.

We claim:

1. A process for granulating ammonium nitrate fertilizer with a nitrogen content of between 25 and 34% by weight comprising blending a concentrated aqueous ammonium nitrate solution with an effective amount of ammonium phosphate and ammonium sulphate in a first mixing vessel, further concentrating the blended ammonium compounds in a first evaporator and separating steam therefrom so as to form a molten salt mixture, admixing said molten salt mixture with a member selected from the group consisting of ground anhydrous limestone, dolomite and mixtures thereof in a second mixing vessel, the resultant blended molten salt mixture having a free water content of 1–1.5% and a temperature of 150°–165° C. when fed to granulation, granulating said blended molten salt and cooling the granules, said process characterized in that said blended molten salt mixture contains $MgSO_4xH_2O$ in a concentration of between 0.5 and 5% where x is between 0 and 7.

2. The process of claim 1, characterized in that $MgSO_4$ is added, in the form of a concentrated aqueous solution or a solid in any one of its crystalline forms and its various degrees of hydration, to the concentrated aqueous ammonium nitrate in the first mixing vessel.

3. The process of claim 1, wherein the addition is fin such a quantity as to obtain a soluble MgO content of between 0.2 and 1.8% in the final mix.

4. The process of claim 1, characterized in that $MgSO_4$ is added, in the form of a concentrated aqueous solution or a solid in any one of its crystalline forms and its various degrees of hydration, to the molten salt mixture in the second mixing vessel.

5. The process of claim 4, wherein the addition is in such a quantity as to obtain a soluble MgO content of between 0.2 and 1.8% in the final mix.

* * * * *